Aug. 24, 1954     T. A. ST. CLAIR     2,687,140

CHANGE-OVER REGULATOR

Filed Oct. 28, 1950

INVENTOR.
THEODORE A. ST. CLAIR
BY
*Richey & Watts*
ATTORNEYS

Patented Aug. 24, 1954

2,687,140

UNITED STATES PATENT OFFICE 2,687,140

CHANGE-OVER REGULATOR

Theodore A. St. Clair, South Euclid, Ohio, assignor to The Weatherhead Company, Cleveland, Ohio, a corporation of Ohio Application October 28, 1950, Serial No. 192,706

2 Claims. (Cl. 137—113)

This invention relates to pressure regulators, and more particularly to pressure regulators of the type known as automatic changeover regulators. The aforesaid type of regulators are, for example, employed in dual tank installations for burning liquefied petroleum gas arranged to change over automatically to a fresh cylinder when the pressure in the primary cylinder drops below a predetermined value, and are provided with manual adjustment means to shift all service over to the fresh cylinder. Regulators of this type employ a spring-loaded regulating diaphragm, a pair of spring-loaded valves for controlling flow from the two cylinders, such valves being operated by the diaphragm. The manually-controlled means are for biasing one valve more than the other.

The principal object of the invention resides in increasing the sensitivity and responsiveness of the regulator without detracting from the service life thereof. This is accomplished by providing a stop on the diaphragm spring-loading mechanism which eliminates the need for heavy springs on the valve to oppose motion of the diaphragm when there is little or no pressure in the regulating chamber. This increases the life of the diaphragm in that the valves do not bear against it with a large force, and furthermore it increases the sensitivity of the regulator because all the springs may be made with a relatively small spring rate.

Another object resides in protecting the diaphragm from the full spring load by means of simple and effective stop means.

Another object resides in simplifying and rendering more uniform in action the spring-loading and control means for the diaphragm. This is accomplished by mounting a spring between two washers which are keyed to the operating spindle that effects the manual changeover whereby no torque or friction loads are imparted to the spring upon changeover.

Still another object resides in providing a self-locking, readily-effected spring adjustment for the diaphragm which is accomplished by forming one of the spring seats as a nut having serrations on its periphery, which may be held by a tool inserted through a hole in the wall of the valve body to cause adjustment of the spring by rotation of the changeover handle while the nut is so held by the tool. This is a very simple adjustment that can be made without disassembling the valve, and the regulating spring itself serves as the locking means for the adjustment.

Another object of the invention is simplifying the production of two types of regulators, one being an automatic changeover device and the other a manual changeover device. According to the invention the only change necessary to provide both types of regulators is in the length of the valve-operating pins.

The manner in which these and other objects and advantages are accomplished will be apparent from the following detailed description of a preferred embodiment of the invention.

Figure 1:
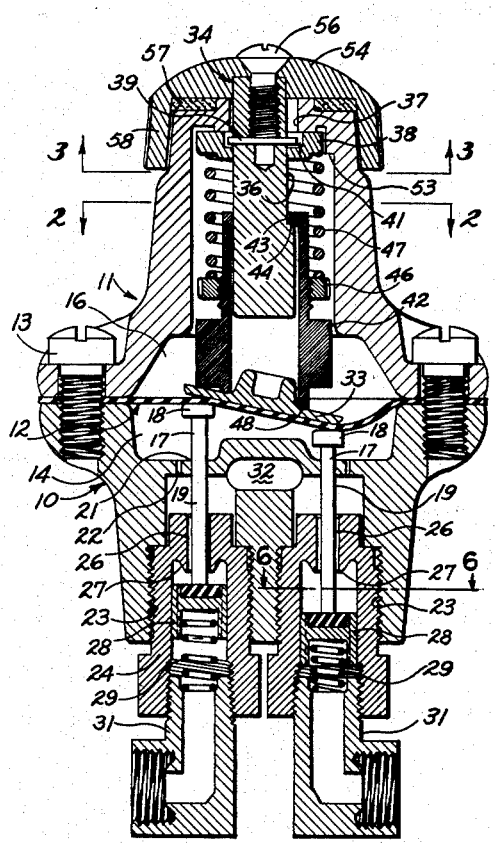
Fig. 1 is a vertical section through the regulator.

The valve body (as disposed in the drawings) includes a lower section 10 and an upper section 11 between which is clamped the diaphragm 12 by means of screws 13. This assembly results in a pressure or regulating chamber 14 bounded partially by the diaphragm, and an atmospheric chamber 16 disposed above the diaphragm. A pair of valve-operating pins 17 are formed with heads 18 for engaging the diaphragm and with shanks 19 extending through suitable openings in guide wall 21. Suitable ports 22 or their equivalent may be provided so that the lower portion of the valve is at the regulated pressure.

The valve assemblies are mounted in threaded bores 23 which receive plugs 24 having end walls apertured as at 26 to loosely receive the shanks 19 of the valve-operating pins. Valve seats 27 are likewise formed in the plugs 24, these being engageable by valves or poppets 28 in order to seal off the regulating chamber from the inlet thereto. The poppets are urged toward their closed position by comparatively light springs 29 which engage the poppets at one end and which rest at their other end on fittings 31 threaded into plugs 24 and adapted to make connection with a hose end or the like. The poppet valves 28 are hexagonal in section to provide clearance for fluid flow past the valves.

An outlet port 32 leads from the pressure zone of the valve outwardly through the side wall of the lower body member 10. The details of the port arrangement and its provision for connection to a service line are not critical to the invention and are known in the art.

Above the diaphragm is a special washer 33 for protecting the diaphragm at its operating zone. In order to bias the diaphragm and provide for manual changeover new and improved structure is provided. This structure includes a stem 34 flattened along a part of its length as at 36, the upper end of which may be disposed through a bore 37 formed in a transverse wall of the upper body member 11. A combined spring seat and stop member is provided in the form of a washer 38 having a flat portion fitting over the flat 36 on the stem, and secured on the stem by means of a pin 39 passing through the stem, and retained in an offset groove 41 formed in the washer 38 so as to prevent dislocation of the pin in service.

A plunger 42 in the form of a sleeve-like member has a central bore slidable along stem 34. This plunger has a flange 43 which makes a splined or driving engagement with the flat 36 on the stem and also serves as a stop or abutment flange that engages the shoulder 44 formed on the stem by termination of the flat 36. A nut 46 having grip means in the form of peripheral serrations 46a is threaded on a shank portion of plunger 42. This nut serves as an adjustable spring base for the spring 47, which extends between the nut and the keyed washer 38. The lower portion of the plunger 42 has a tilted cam surface 48 formed for engaging the special washer 33 that forms with the plunger a cam and cam face for engaging the diaphragm.

Figure 3:
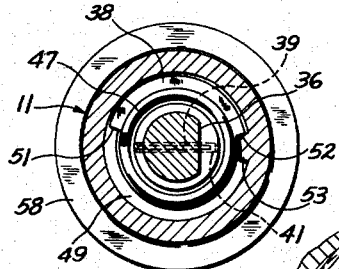
Fig. 3 is a section taken on 3—3 of Fig. 1.
Figure 6:
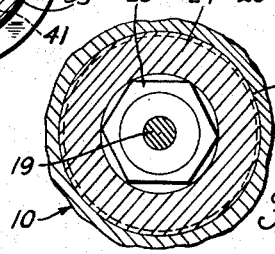

As best seen in Fig. 3, the washer 38 is cut away as at 49 about a part of its circumference to produce a pair of shoulders 51 and 52 which alternatively engage an abutment 53 formed on the body, thereby serving to limit rotation of the washer and the parts keyed with it to an arc of 180°. The assembly is completed by slipping the aforesaid stem assembly into the upper body portion 11 before the body portion is attached to the lower body portion 10. The stem assembly is retained in place by a cap 54 and a screw 56 through the cap and washer 38 serving to locate the stem axially in the body. A felt sealing washer 57 is between the cap and the body to exclude dirt but permit air to enter the chamber above the diaphragm so that the regulator may breathe. The cap has a flange 58 which overlaps the body and serves as a grip means as well as assisting in the exclusion of dirt from the interior of the regulator.

Figure 4:
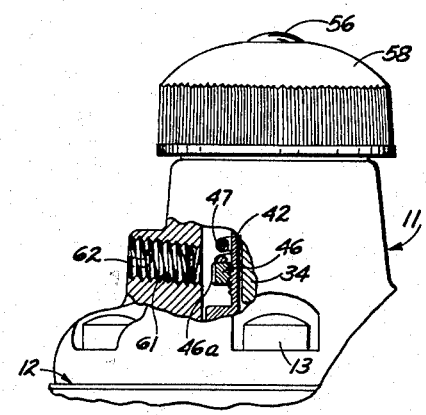
Fig. 4 is a fragmentary section showing the adjustment arrangement.
Figure 2:
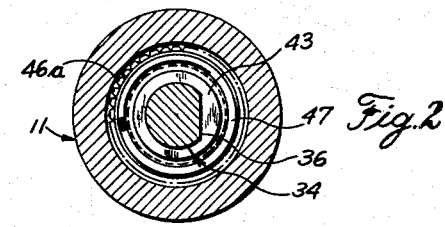
Fig. 2 is a section taken on 2—2.

As best seen in Fig. 4, the wall of the body has a threaded opening 61 which may be normally closed by a screw plug 62. When the screw plug 62 is removed a tool, such as a screw driver, may be inserted through the opening 61 against the serrations 46a. In this manner the nut 46 may be held against rotation while the handle is rotated through 180° in the desired direction to adjust the spring tension. By sequential application of the tool and rotation of the handle in ratchet fashion, the nut may be readily adjusted to set the regulator.

The operation of the regulator, insofar as the distribution of pressures and changeover functions are concerned, is not a feature of the invention except for the sensitivity of the device, such operation being well known in the art. Since one of the valves 28 is biased to open more than the other, when pressure reaches the pressure chamber 14 and lifts the diaphragm fluid will pass through the heavily-biased valve (the right valve in Fig. 1) until the pressure drops below a predetermined value, which is a value representing substantial depletion of the primary tank. At this pressure the regulator diaphragm drops enough to open the other (or lefthand valve in Fig. 1) thereby drawing fluid from the reserve tank at a reduced pressure. This condition continues until the cap is turned 180° reversing the bias on the valves, whereupon fluid is delivered from the reserve tank at a higher regulated pressure and the other tank valve is closed.

With the valve disconnected from a source of pressure (as shown in Fig. 1), the stop 43 protects the diaphragm from being excessively urged against the heads of pins 17, nor is the diaphragm urged against a fixed stop in the valve body. Since the valve springs 29 need not oppose diaphragm motion with enough force to prevent the diaphragm from being damaged, these springs may be very light just so long as they are strong enough to hold the pins 17 against the diaphragm. By the same token the main regulating spring may be made lighter than usual, all of these factors cooperating to increase the sensitivity or responsiveness of the regulator, and at no time is the diaphragm subjected to the full load of the regulating spring 47 with such load pressing the diaphragm against a mechanical body.

The keyed washer and spring seat arrangement of parts 38, 46, 42, and 34 results in all these parts moving together upon changeover by rotation of the handle 54. Thus, the spring 47 rotates with these parts during manual changeover so that no torque or frictional loads are applied to or through the spring, which permits it to be of light construction, materially reduces the turning torque during manual changeover, and assists in maintaining the regulator setting. The various parts are quickly and simply assembled without need for tools other than a screw driver, and once assembled cannot become disassembled in service.

Figure 5:
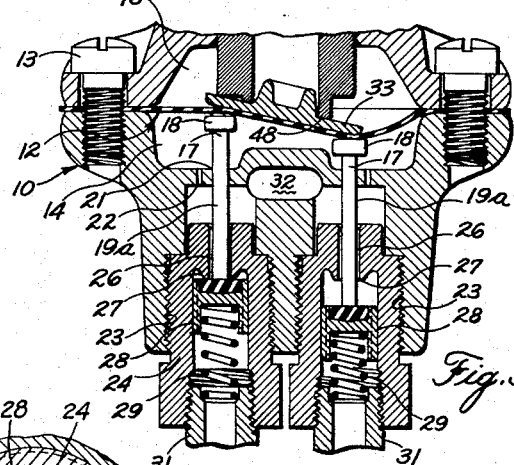
Fig. 5 is a partial section showing a modified form wherein automatic changeover is not provided; and, Fig. 6 is a partial cross section taken along 6—6 of Fig. 1.

In the form shown in Fig. 5 the pins 19a are both shorter than pins 19 of the preferred embodiment. The decrease in pin length is sufficient to permit one of valves 28 (the left valve in Fig. 5) to close when the inlets are not connected to their tanks. Thus, no matter how low the pressure becomes in the service tank (right valve for example) the other valve will not open until the handle is turned. Thus, either an automatic or a manual regulator may be provided by merely stocking two sizes of pins.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. In a change-over regulator including a body having a chamber, said chamber having a plurality of inlets and an outlet, a diaphragm forming at least a portion of one wall of the chamber, each inlet having a spring closed valve controlling fluid flow therethrough and an operating rod extending from a portion adjacent from said diaphragm, a change-over device for selectively operating said valves comprising a plunger means having a cam engaging the diaphragm and intended for rotation and reciprocation in the body, a turning stem attached to the plunger means and rotatably mounted on the body, a washer fastened to said stem and spaced from said plunger means, a nut threaded on said plunger means, spring means extending between said washer and nut, and a handle connected to said stem, said stem being provided with means preventing relative rotation between said stem washer and plunger whereby there is no relative rotation between the spring and said nut and washer when said stem is rotated to selectively operate said valves.

2. In a change-over regulator including a body having a chamber, said chamber having a plurality of inlets and an outlet, a diaphragm forming at least a portion of one wall of the chamber, each inlet having a spring closed valve controlling fluid flow therethrough and an operating rod extending from a portion adjacent from said diaphragm, a change-over device for selectively operating said valves comprising a plunger means having a cam engaging the diaphragm and intended for rotation and reciprocation in the body, a turning stem attached to the plunger means and rotatably mounted on the body, a washer fastened to said stem and spaced from said plunger means, a nut threaded on said plunger means, spring means extending between said washer and nut, and a handle connected to said stem, said stem being provided with means preventing relative rotation between said stem washer and plunger whereby there is no relative rotation between the spring and said nut and washer when said stem is rotated to selectively operate said valves, a stop formed on said stem limiting axial movement of said plunger away from said washer.

References Cited in the file of this patent

UNITED STATES PATENTS

| Number | Name | Date |
|---|---|---|
| 1,157,945 | Hufford | May 19, 1925 |
| 2,104,700 | Russel | Jan. 4, 1938 |
| 2,197,144 | Carnes | Apr. 16, 1940 |
| 2,422,996 | Wendt | June 24, 1947 |
| 2,488,779 | Olson | Nov. 22, 1949 |

FOREIGN PATENTS

| Number | Country | Date |
|---|---|---|
| 75,082 | Switzerland | June 1, 1917 |